United States Patent [19]

Mizuhara

[11] Patent Number: 4,598,025

[45] Date of Patent: Jul. 1, 1986

[54] DUCTILE COMPOSITE INTERLAYER FOR JOINING BY BRAZING

[75] Inventor: Howard Mizuhara, Hillsborough, Calif.

[73] Assignee: GTE Products Corporation, Stamford, Conn.

[21] Appl. No.: 756,526

[22] Filed: Jul. 19, 1985

[51] Int. Cl.$^4$ .............................................. B32B 15/04
[52] U.S. Cl. ................................... 428/450; 228/122; 228/189; 228/263.12; 428/627; 428/630; 428/632; 428/633; 428/661; 428/663; 428/674; 428/675; 428/688

[58] Field of Search ................................ 228/122-124, 228/263.11, 263.12, 263.18, 263.19, 189; 428/627, 630, 632, 633, 689, 698, 699, 660, 661, 663, 671, 674, 675, 405

[56] References Cited

U.S. PATENT DOCUMENTS 3,787,958  1/1974  Freedman et al. ................... 228/122
4,426,033  1/1984  Mizuhara ............................ 228/122

Primary Examiner—Bruce H. Hess
Assistant Examiner—P. R. Schwartz
Attorney, Agent, or Firm—James Theodosopoulos

[57] ABSTRACT

A ceramic part is joined to a metal part by means of a molybdenum copper composite interlayer disposed between, and brazed to, the ceramic part and the metal part.

8 Claims, No Drawings

DUCTILE COMPOSITE INTERLAYER FOR JOINING BY BRAZING

This invention concerns the joining of ceramic parts to metal parts by brazing. Such joining usually requires a ductile reactive metal brazing alloy, ductile to provide for the difference in coefficients of thermal expansion between the ceramic and metal, and reactive in order to wet the ceramic. Such brazing alloys and methods are disclosed in U.S. Pat. Nos. 4,426,033 and 4,448,605. The methods disclosed therein are satisfactory for small parts. However, for larger parts, say, greater than about one inch in cross section at the jointure area, those methods are not satisfactory. This invention is concerned with joining such larger parts.

This invention discloses the use of a metallic composite interlayer between the ceramic and metal parts to be joined. The interlayer is comprised of molybdenum and copper, two metals that have limited alloying properties with each other, and is made by powder metallurgy process and is densified by sintering; thus the interlayer retains some of the properties of the original metals. The interlayer is made so that its coefficient of thermal expansion approximates, or is closer to, the coefficient of expansion of the ceramic part to be joined than to the coefficient of expansion of the metal part to be joined.

The reason for the use of molybdenum and copper, which have limited solubility with each other, can be shown as follows. The composite will have properties between those of molybdenum and copper. Thus, the composite will have a thermal expansion coefficient between $5.2 \times 10^6$ and $17 \times 10^{-6}$ per degree Centigrade, the respective coefficients of molybdenum and copper. Also, the Brinell hardness, for example, will be between 179 and 35, the respective hardnesses for molybdenum and copper. Similarly, the thermal conductivity will be between 0.94 and 0.7 calorie per centimeter per °C. per second. In contrast, in metals which form a solid solution type alloy, for example, copper and gold, the alloy will not necessarily have properties between those of copper and gold. For example, in a 50 copper-50 gold alloy, the Brinell hardness is 108, well outside the respective hardnesses of 35 for copper and 25 for gold. Also the thermal conductivity is 0.12, well outside 0.94 for copper and 0.7 for gold.

EXAMPLE 1

A 3 inch diameter alumina ceramic disc was joined to a 3 inch diameter ductile iron part as follows.

An 80 volume percent molybdenum powder having 10 microns average particle size was blended with 20 volume percent copper powder averaging 5 microns in a ball mill for one hour. The blend was placed in a 3½ inch diameter die, filled loose to a height of 0.3 inches, and pressed at 20,000 to 30,000 psi to form a 0.13 inch thick disc, which was then sintered at 1100° C. under hydrogen atmosphere for one hour to become a densified monolithic disc. The sintered disc was then nickel plated, rinsed well, and then sintered at 950° C. for 30 minutes.

A 4 mil thick foil by 3 inch diameter preform made from Cusil ABA was placed between the alumina disc, having a lapped surface, and the nickel plated molybdenum copper composite disc. Cusil ABA is a 70% silver, 28% copper, 2% titanium brazing alloy and is a trademark of WESGO, a division of GTE Products Corporation.

The assembly was heated to 840° C. for 10 minutes under $10^{-5}$ torr vacuum and furnace cooled slowly to room temperature.

A 4 mil thick 3 inch diameter disc of Incusil 15 alloy foil was then placed between the other face of the nickel plated molybdenum copper composite disc and the ductile iron part, and the assembly was brazed at 750° C. for 10 minutes under hydrogen atmosphere, then slowly cooled to room temperature. Incusil 15 is a trademark of WESGO, consists of 61.5% silver, 24% copper and 14.5% indium, and has a solidus of 605° C., a liquidus of 705° C.

In this example, the alumina disc was satisfactorily bonded to the ductile iron. The coefficients of thermal expansion of the alumina, ductile iron and molybdenum-copper composite were, respectively, $7 \times 10^{-6}/°C.$, $12 \times 10^{-6}/°C.$, and $7.2 \times 10^{-6}/°C.$

EXAMPLE 2

A silicon nitride disc, 1½ inch diameter by ¼ inch thick, was brazed to a ductile iron disc, 1½ diameter by ½ inch thick, as follows.

An assembly consisting of a 50 mil thick molybdenum copper composite between the silicon nitride disc and the ductile iron disc, with a 4 mil thick by 1½ inch diameter preform of Cusil ABA brazing filler alloy on each side of the molybdenum copper composite, was prepared. The assembly was placed in a vacuum furnace and brazed at 850° C. for 10 minutes at $10^{-5}$ torr vacuum, then slowly cooled to room temperature.

The assembly was cycled 10 times between room temperature and 600° C. without failure.

In this example the molybdenum copper composite was prepared as follows. A blend of 97 volume percent molybdenum powder, about 20 micron particle size, and 3 volume percent copper powder, also about 20 micron particle size, was prepared. The blend was then mixed with an organic binder solution in a ratio of 90 to 10. The organic binder solution consisted of 85% isopropyl alcohol, 15% organic binder. The mix of blend and organic binder solution was then tape cast on to a mylar sheet using a doctor blade to about 125 mil thickness and dried. The tape, dried to about 70 mil thickness, was cut and sintered at 1190° C. under hydrogen atmosphere for one hour and cooled. The sintered tape was about 50 mils thick.

In this example, the silicon nitride disc was made of SNW-2000 silicon nitride, a product manufactured by WESGO. The respective coefficients of thermal expansion of the silicon nitride, ductile iron and molybdenum copper composite were 3.5, 12 and 5.4, all times $10^{-6}/°C.$

EXAMPLE 3

A 2 inch diameter by ¼ inch thick partially stabilized zirconia ceramic disc was bonded to a 2 inch diameter by ½ inch thick ductile iron substrate as follows.

The zirconia disc was lapped on one surface to remove about 4 mils from the surface. The sintered composite consisted of 60 volume percent molybdenum, 40 volume percent copper, 2 inches diameter by 75 mils thick, nickel plated, hydrogen sintered at 950° C. for 30 minutes. The assembly, from the top down, consisted of the zirconia disc, an Incusil 5 ABA brazing preform, the composite, an Incusil 15 brazing preform, and the ductile iron substrate. The assembly was brazed at 760° C. for 10 minutes under $10^{-5}$ torr vacuum and then slowly cooled to room temperature. The parts were satisfactorily bonded. Incusil 15 ABA is 60.5 percent silver, 24 percent copper, 14.5 percent indium, 1 percent titanium.

The respective coefficients of thermal expansion of the zirconia, ductile iron and molybdenum copper composite were 10, 12 and 10, all times $10^{-6}/°C$.

I claim:

1. A ceramic part joined to a metal part by means of a molybdenum copper composite interlayer therebetween, the composite being prepared by the steps of blending molybdenum powder with copper powder, forming the blend into a shape, and densifying the blend by sintering and being brazed using a brazing alloy to both the ceramic part and the metal part, the coefficient of thermal expansion of the composite being closer to the coefficient of thermal expansion of the ceramic part than to the coefficient of thermal expansion of the metal part.

2. The jointure of claim 1 wherein the molybdenum copper composite comprises a monolith made by powder metallurgy process and densified by sintering.

3. The jointure of claim 1 wherein the metal part is ductile iron and the braze between the composite and the metal part comprises a brazing alloy composed of silver, copper and indium or silver, copper and titanium.

4. The jointure of claim 1 wherein the ceramic part comprises alumina or silicon nitride and the braze between the composite and the ceramic part comprises silver, copper and titanium.

5. The jointure of claim 1 wherein the ceramic part comprises partially stabilized zirconia and the braze between the composite and the ceramic part comprises silver, copper, indium and titanium.

6. The method of joining a ceramic part to a metal part comprising the steps of preparing a densified molybdenum copper composite having a coefficient of thermal expansion closer to that of the ceramic part than to that of the metal part, disposing the composite between the ceramic part and the metal part, and brazing the composite to both the ceramic part and the metal part said composite being prepared by the steps of blending molybdenum powder with copper powder, forming the blend into a shape, and densifying by sintering.

7. The method of claim 6 including the step of nickel plating the composite prior to brazing.

8. The method of claim 6 including the steps of forming an assembly of the composite between the ceramic part and the metal part with a reactive metal brazing alloy preform between the ceramic part and the composite, and a brazing alloy preform between the metal part and the composite, and brazing the assembly.

* * * * *